(12) United States Patent
Pierce

(10) Patent No.: US 9,659,556 B1
(45) Date of Patent: May 23, 2017

(54) METHODS OF REPAIRING AN ACOUSTIC SANDWICH PANEL AND ACOUSTIC SANDWICH PANEL REPAIR KITS THEREFOR

(71) Applicant: The Boeing Company, Chicago, IL (US)

(72) Inventor: Evan F. Pierce, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/052,097

(22) Filed: Feb. 24, 2016

(51) Int. Cl.
| *G10K 11/168* | (2006.01) |
| *B60R 13/08* | (2006.01) |
| *B64D 33/02* | (2006.01) |
| *F02K 1/34* | (2006.01) |
| *B64C 1/40* | (2006.01) |

(52) U.S. Cl.
CPC ........ *G10K 11/168* (2013.01); *B60R 13/0815* (2013.01); *B64C 1/40* (2013.01); *B64D 33/06* (2013.01); *B64D 2033/0206* (2013.01)

(58) Field of Classification Search
USPC .................. 156/293; 181/284, 288, 290, 292
See application file for complete search history.

(56) References Cited

U.S. PATENT DOCUMENTS

| 8,696,843 B1 * | 4/2014 | Dean ....................... B32B 43/00 156/98 |
| 8,967,330 B2 * | 3/2015 | Comon .................... B23K 9/16 156/94 |
| 2014/0290831 A1 | 10/2014 | Hatano et al. |

* cited by examiner

*Primary Examiner* — Jeff Aftergut
*Assistant Examiner* — Jaeyun Lee
(74) *Attorney, Agent, or Firm* — Walters & Wasylyna LLC

(57) ABSTRACT

A method of repairing an acoustic core cell of an acoustic sandwich panel is provided. The method comprises inserting a core repair splice adjacent to a number of damaged walls of the acoustic core cell of the acoustic sandwich panel, nesting the core repair splice onto the number of damaged walls, and bonding the core repair splice to the number of damaged walls and thereby to repair the acoustic core cell of the acoustic sandwich panel.

9 Claims, 8 Drawing Sheets

METHODS OF REPAIRING AN ACOUSTIC SANDWICH PANEL AND ACOUSTIC SANDWICH PANEL REPAIR KITS THEREFOR

FIELD

The present invention relates to acoustic sandwich panels, and is particularly directed to methods of repairing an acoustic sandwich panel and acoustic sandwich panel repair kits therefor.

BACKGROUND

Sandwich panels are typically formed from a core sandwiched between two liner sheets. The core may be relatively thick, yet lightweight, as compared to the liner sheets. The liner sheets may be relative thin, yet stiff. Therefore, sandwich panels typically possess relatively high strength and stiffness at relatively low weight. As such, sandwich panels are widely used in various aerospace applications.

Like traditional sandwich panels, acoustic sandwich panels include a core sandwiched between two liner sheets. One of the liner sheets is perforated, while the other liner sheet is not perforated. The core provides bulk and defines a plurality of cavities. The apertures defined by the perforated liner sheet fluidly couple the cavities with the ambient environment. Therefore, when air flows across the perforated liner sheet of an acoustic sandwich panel, the cavities in the core act as Helmholtz resonators and attenuate the sound of the associated airflow. More specifically, core walls between adjacent cavities in the core act as acoustic septa to attenuate the sound of the airflow.

Because of their relatively light weight and sound attenuating capability, acoustic sandwich panels have been used in various industries, including the aerospace industry. For example, acoustic sandwich panels are commonly incorporated into bypass gas turbine aircraft engines, such as into the inlet inner barrels, fan duct walls and/or exhaust nozzles, to attenuate the noise associated with high volume airflows.

From time to time, an acoustic core cell of the core becomes damaged. As an example, a cell wall of an acoustic core cell can crack. A known way to repair the damaged cell wall is to fill the cavity of the acoustic core cell with repair material such as foaming adhesive or potting compound. A drawback with this known way of repairing the damaged cell wall is that the repair material placed into the cavity fouls acoustic septa associated with that cavity. The fouling of acoustic septa has a negative effect on the attenuation capacity of the acoustic sandwich panel. It would be desirable to be able to repair a damaged acoustic core cell of an acoustic sandwich panel without fouling acoustic septa in the cavity of the acoustic core cell.

SUMMARY

In one aspect, a method of repairing an acoustic core cell of an acoustic sandwich panel is disclosed. The method comprises inserting a core repair splice adjacent to a number of damaged walls of the acoustic core cell of the acoustic sandwich panel, nesting the core repair splice onto the number of damaged walls, and bonding the core repair splice to the number of damaged walls and thereby to repair the acoustic core cell of the acoustic sandwich panel.

In another aspect, an acoustic sandwich panel repair kit is disclosed for repairing an acoustic sandwich panel. The acoustic sandwich panel repair kit comprises a ribbon of core repair splices. Each core repair splice includes a plurality of surfaces shaped to conform to a number of damaged walls of an acoustic core cell of an acoustic sandwich panel. The acoustic sandwich repair kit further comprises a container of adhesive for applying to the plurality of surfaces of a core repair splice and a number of damaged walls of an acoustic core cell of an acoustic sandwich panel during repair of the acoustic sandwich panel.

In yet another aspect, an acoustic sandwich panel repaired using an adhesive is disclosed. The repaired acoustic sandwich panel comprises an acoustic core cell having at least one damaged wall and septa disposed in a cavity of the acoustic core cell, and a core repair splice adhesively bonded to the at least one damaged wall of the acoustic core cell without the adhesive substantially affecting attenuation capacity of the septa that is disposed in the cavity of the acoustic cell.

Other aspects will become apparent from the following detailed description, the accompanying drawings and the appended claims.

DETAILED DESCRIPTION

The present application is directed to methods of repairing an acoustic sandwich panel and acoustic sandwich panel repair kits therefor. The specific repair methods, repair kits, and the industry in which the repair methods and repair kits are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes acoustic sandwich panel repair methods and acoustic sandwich panel repair kits implemented by the Boeing Corporation for aircraft in compliance with Federal Aviation Administration (FAA) regulations.

Figure 1:
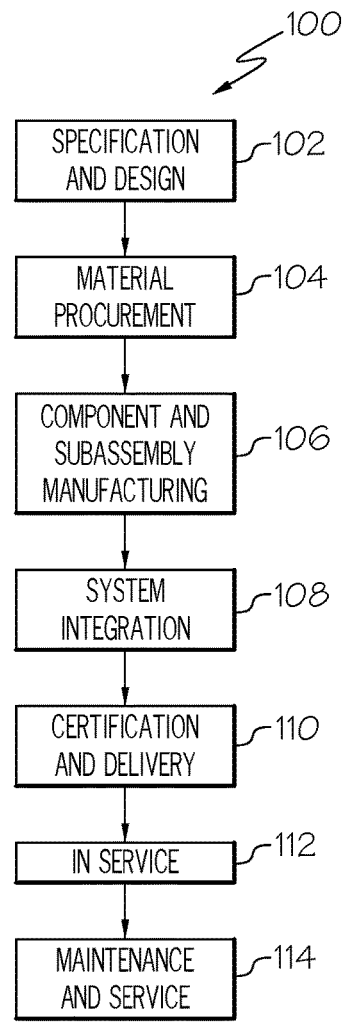
FIG. 1 is a flow diagram of an aircraft manufacturing and service methodology.
Figure 2:
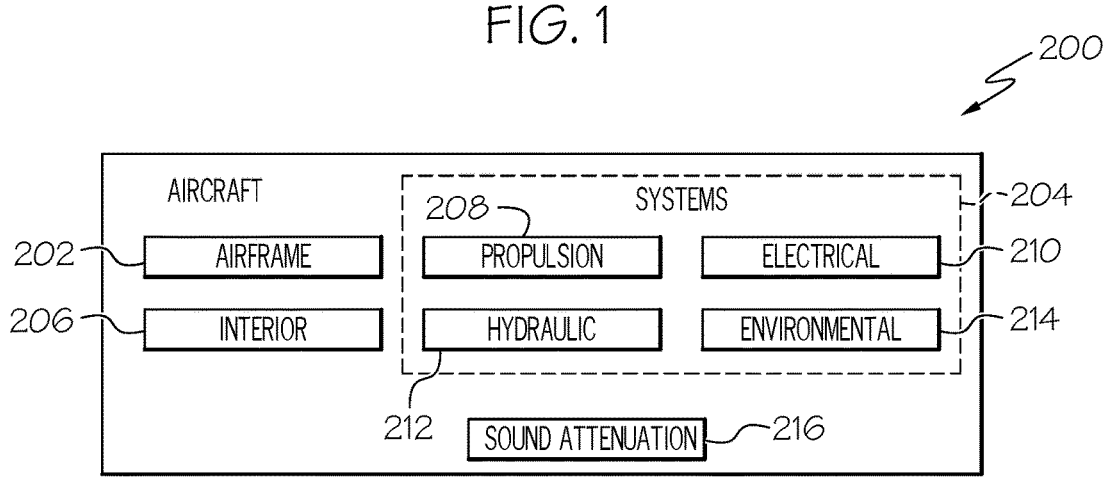
FIG. 2 is a block diagram of an aircraft.

Examples of the present disclosure may be described in the context of an aircraft manufacturing and service method 100 as shown in FIG. 1 and an aircraft 200 as shown in FIG. 2. During pre-production, the illustrative method 100 may include specification and design, as shown at block 102, of the aircraft 200 and material procurement, as shown at block 104. During production, component and subassembly manufacturing, as shown at block 106, and system integration, as shown at block 108, of the aircraft 200 may take place. Thereafter, the aircraft 200 may go through certification and delivery, as shown block 110, to be placed in service, as shown at block 112. While in service, the aircraft 200 may be scheduled for routine maintenance and service, as shown at block 114. Routine maintenance and service may include modification, reconfiguration, refurbishment, etc. of one or more systems of the aircraft 200.

Each of the processes of illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 200 produced by illustrative method 100 (FIG. 1) may include an airframe 202 with a plurality of high-level systems 204 and an interior 206. Examples of high-level systems 204 may include one or more of propulsion system 208, electrical system 210, hydraulic system 212, environmental system 214, and sound attenuation system 216. Any number of other systems may be included. Although an aerospace example is shown, the principles disclosed herein may be applied to other industries, such as the automotive and marine industries. Accordingly, in addition to the aircraft 200, the principles disclosed herein may apply to other vehicles (e.g., land vehicles, marine vehicles, space vehicles, etc.).

The disclosed acoustic sandwich panel repair methods and kits may be employed during any one or more of the stages of the manufacturing and service method 100. For example, components or subassemblies corresponding to component and subassembly manufacturing (block 106) and inadvertently damaged during fabrication or manufacture may be repaired using the disclosed acoustic sandwich panel repair methods and kits. Also, the disclosed acoustic sandwich panel repair methods and kits may be utilized during production stages (blocks 106 and 108). However, the disclosed acoustic sandwich panel repair methods and kits may be especially utilized, for example and without limitation, while aircraft 200 is in service (block 112) and/or during the maintenance and service stage (block 114).

Figure 3:
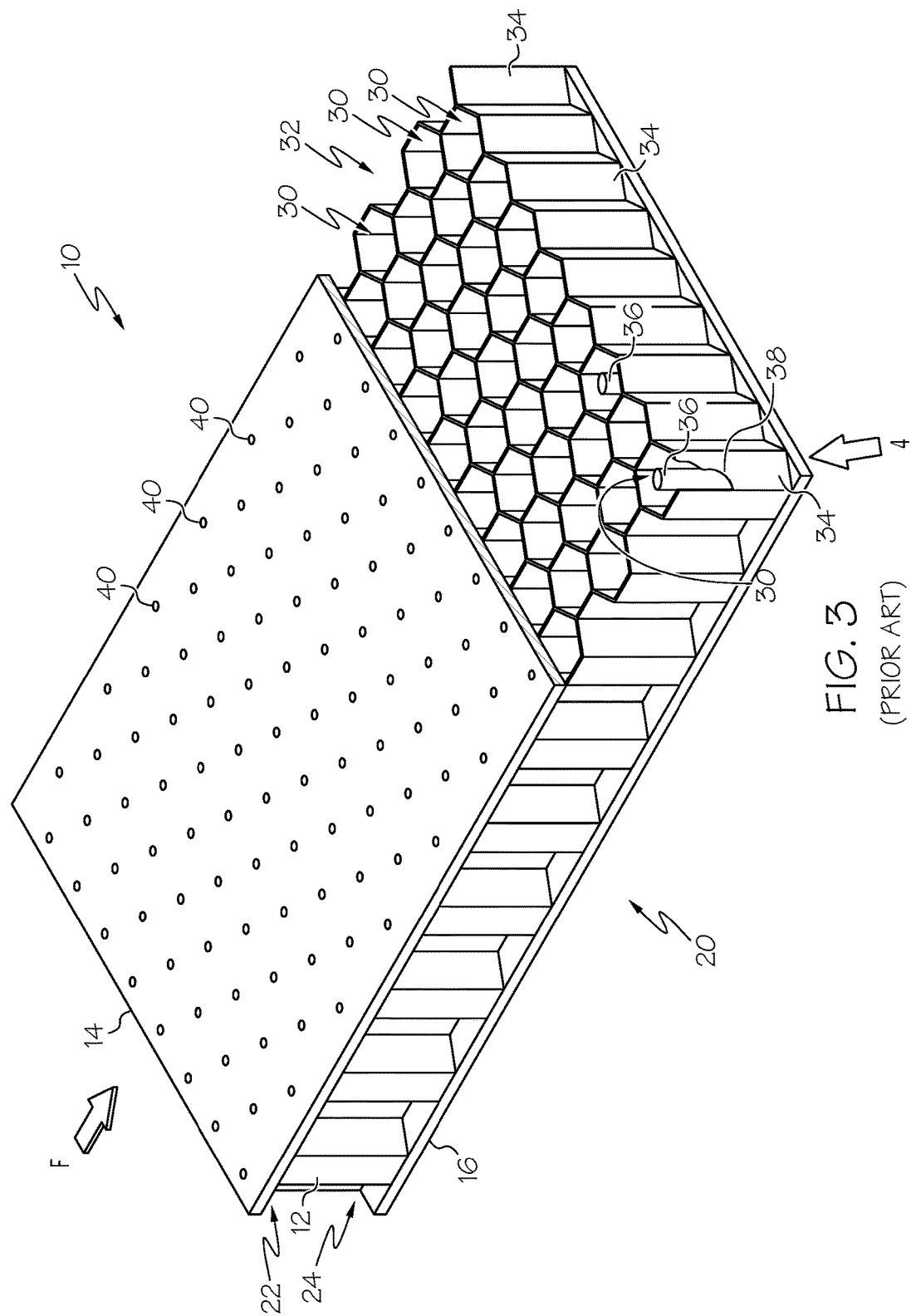
FIG. 3 is a perspective view of a known acoustic sandwich panel including an acoustic core cell that has a damaged core cell wall in need of repair.

Referring to FIG. 3, a known acoustic sandwich panel, generally designated 10, may include a core 12, a first liner sheet 14, a second liner sheet 16 and a plurality of inserts 36. The core 12, the first liner sheet 14 and the second liner sheet 16 form a layered structure 20, and the inserts 36 are positioned and housed within the core 12 of the layered structure 20. For simplicity and clarity of discussion, only two inserts 36 are shown in FIG. 3.

While the layered structure 20 of the acoustic sandwich panel 10 is shown and described having three layers (the core 12, the first liner sheet 14 and the second liner sheet 16), additional layers, such as additional core layers, additional liner sheets and/or additional other layers, may be included in the layered structure 20 without departing from the scope of the present disclosure. In certain applications, the second liner sheet 16 may be optional (or rendered optional due to application) and, therefore, may be omitted from the layered structure 20 of the acoustic sandwich panel 10 without departing from the scope of the present disclosure.

The core 12 of the acoustic sandwich panel 10 may include a first major side 22 and an opposed second major side 24. The first liner sheet 14 may be connected (e.g., adhered, welded, braised, mechanically fastened etc.) to the first major side 22 of the core 12 and the second liner sheet 16 may be connected (e.g., adhered, welded, braised, mechanically fastened etc.) to the second major side 24 of the core 12, thereby sandwiching the core 12 between the first liner sheet 14 and the second liner sheet 16, and forming the layered structure 20.

The cross-sectional thickness of the core 12 of the acoustic sandwich panel 10 may be relatively thick, as compared to the cross-sectional thicknesses of the first liner sheet 14 and the second liner sheet 16. In one expression, the cross-sectional thickness of the core 12 may be at least 1.5 times greater than the cross-sectional thickness of the first liner sheet 14. In another expression, the cross-sectional thickness of the core 12 may be at least 2 times greater than the cross-sectional thickness of the first liner sheet 14. In another expression, the cross-sectional thickness of the core 12 may be at least 5 times greater than the cross-sectional thickness of the first liner sheet 14. In another expression, the cross-sectional thickness of the core 12 may be at least 10 times greater than the cross-sectional thickness of the first liner sheet 14. In another expression, the cross-sectional thickness of the core 12 may be at least 20 times greater than the cross-sectional thickness of the first liner sheet 14. In yet another expression, the cross-sectional thickness of the core 12 may be at least 40 times greater than the cross-sectional thickness of the first liner sheet 14. Despite being relatively thick, the core 12 may have a relatively lower density (basis weight divided by cross-sectional thickness), as compared to the densities of the first liner sheet 14 and the second liner sheet 16.

The core 12 of the acoustic sandwich panel 10 may define a plurality of cavities 30. Each cavity 30 may have a volume, which may be bounded by the core 12, the first liner sheet 14 and, optionally, the second liner sheet 16. Those skilled in the art will appreciate that the volume of each cavity 30 may be a design consideration.

In one particular realization, the core 12 of the acoustic sandwich panel 10 may have a honeycomb structure 32 that includes an array of tightly packed acoustic core cells 34, with each cell 34 of the honeycomb structure 32 defining an associated cavity 30 and cavity volume. The cells 34 of the honeycomb structure 32 may be tubular and may have a cross-sectional shape, such as hexagonal, square, rectangular, circular, ovular, or the like. The cavities 30 defined by the cells 34 of the honeycomb structure 32 may extend continuously through the core 12 from the first liner sheet 14 to the second liner sheet 16.

While a core 12 having a honeycomb structure 32 with uniform and regular-shaped cells 34 is shown and described, those skilled in the art will appreciate that cavities 30 having various three-dimensional shapes, whether regular or irregular, may be used without departing from the scope of the present disclosure. Therefore, a honeycomb structure 32 is only one specific, non-limiting example of a suitable structure for the core 12 of the acoustic sandwich panel 10.

Compositionally, the first liner sheet 14 of the acoustic sandwich panel 10, which may be single ply or multi-ply, may be formed from various materials or combinations of materials. The composition of the first liner sheet 14 may be the same as, similar to, or different from the composition of the core 12. As one example, the first liner sheet 14 may be formed from a metal or metal alloy, such as steel, titanium, a titanium alloy, aluminum or an aluminum alloy. As another example, the first liner sheet 14 may be formed from a composite, such as a carbon fiber-reinforced composite or a fiberglass composite. As yet another example, the first liner sheet 14 may be formed from a ceramic material.

The first liner sheet 14 of the acoustic sandwich panel 10 may be perforated. Specifically, the first liner sheet 14 may define a plurality of apertures 40 extending therethrough. Each aperture 40 of the first liner sheet 14 may provide fluid communication with an associated cavity 30 in the underlying core 12. While a single aperture 40 per cavity 30 is shown in FIG. 1, in an alternative construction, two or more apertures 40 per cavity 30 may be formed in the first liner sheet 14.

Thus, each aperture 40 may fluidly couple an associated cavity 30 with an airflow (designated with arrow F shown in FIG. 3) moving across the top side (as viewed looking at FIG. 3) of the acoustic sandwich panel 10. Therefore, the fluid communication between the airflow F and the cavities 30 in the core 12 of the acoustic sandwich panel 10—by way of the apertures 40 of the first liner sheet 14—may allow the cavities 30 to function as Helmholtz resonators, thereby attenuating the sound of the airflow F.

The second liner sheet 16 of the acoustic sandwich panel 10 may be layered over the second major side 24 of the core 12, thereby enclosing the cavities 30 of the core 12 along the second major side 24. Connection between the second liner sheet 16 and the core 12 may be effected using any suitable technique, the selection of which may require consideration of the composition of the core 12 and the composition of the second liner sheet 16. Examples of techniques that may be used to connect the second liner sheet 16 to the core 12 include, but are not limited to, welding, braising, soldering, bonding, adhering and/or mechanically fastening.

Compositionally, the second liner sheet 16 of the acoustic sandwich panel 10, which may be single ply or multi-ply, may be formed from various materials or combinations of materials. The composition of the second liner sheet 16 may be the same as, similar to, or different from the composition of the core 12. Also, the composition of the second liner sheet 16 may be the same as, similar to, or different from the composition of the first liner sheet 14. As one example, the second liner sheet 16 may be formed from a metal or metal alloy, such as steel, titanium, a titanium alloy, aluminum or an aluminum alloy. As another example, the second liner sheet 16 may be formed from a composite, such as a carbon fiber-reinforced composite or a fiberglass composite. As yet another example, the second liner sheet 16 may be formed from a ceramic material.

Unlike the first liner sheet 14 of the acoustic sandwich panel 10, which is perforated, the second liner sheet 16 may not be perforated. Therefore, the second liner sheet 16 may not provide fluid communication between the cavities 30 of the core 12 and the environment outside of the acoustic sandwich panel 10.

At this point, those skilled in the art will appreciate that only a portion of an acoustic sandwich panel 10 is shown in FIG. 3, and that the overall size and shape of the acoustic sandwich panel 10 may depend on the end application. Additionally, while the acoustic sandwich panel 10 is shown in FIG. 3 as being a substantially planar structure, non-planar acoustic sandwich panels (e.g., curved acoustic sandwich panels) are also contemplated. For example, the disclosed acoustic sandwich panel 10 may be used as a wall panel forming the inlet inner wall, fan duct and/or exhaust nozzle of a bypass gas turbine aircraft engine and, therefore, may be sized, shaped and contoured accordingly.

As already mentioned, each cavity 30 of the core 12 may house an insert 36. However, advantage may still be gained by providing only some (but not all) cavities 30 of the core 12 with inserts 50. As one example, at least 10 percent of the cavities 30 of the core 12 may house an insert 36. As another example, at least 25 percent of the cavities 30 of the core 12 may house an insert 36. As another example, at least 50 percent of the cavities 30 of the core 12 may house an insert 36. As another example, at least 75 percent of the cavities 30 of the core 12 may house an insert 36. As another example, at least 90 percent of the cavities 30 of the core 12 may house an insert 36. As yet another example, about 100 percent of the cavities 30 of the core 12 may house an insert 36. An insert 36 may comprise any type of sound attenuating material. As an example, an insert 36 may comprise bulk absorber material, thermal conductor material, or a combination thereof.

For purposes of discussion, one of the acoustic core cells 34 (i.e., the core cell 34 located in the lower left corner of the perspective view of FIG. 3) of the acoustic sandwich panel 10 is shown with an example damaged core cell wall 38. Various embodiments of repair methods and repair kits for repairing damaged walls, such as the damaged core cell wall 38 of the acoustic core cell 34 of the acoustic sandwich panel 10 shown in FIG. 3, are disclosed herein.

Figure 4:
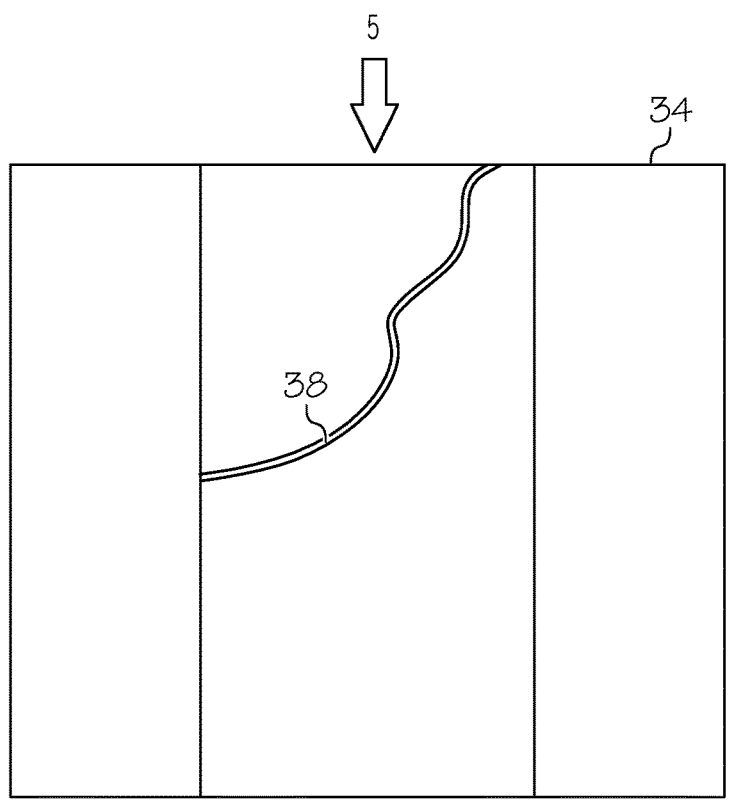
FIG. 4 is a cross-sectional view, looking approximately in the direction of arrow 4 shown in FIG. 3, of the damaged core cell wall of FIG. 3.
Figure 5:
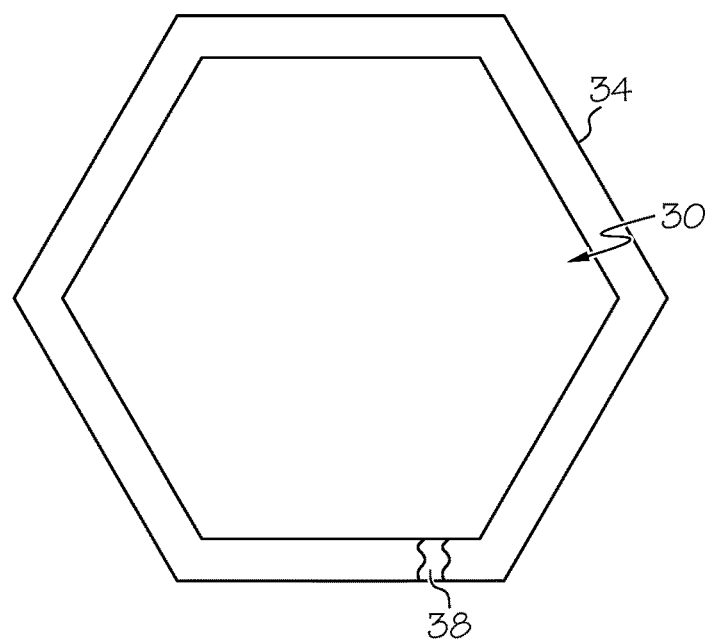
FIG. 5 is a top plan view, looking approximately in the direction of arrow 5 shown in FIG. 4, of the damaged core cell wall of FIG. 4.

Referring to FIG. 4, a cross-sectional view, looking approximately in the direction of arrow 4 shown in FIG. 3, of the damaged core cell wall 38 of FIG. 3 is shown. For clarity of discussion herein, the insert 36 in the cavity 30 of the acoustic core cell 34 shown in FIG. 3 is omitted from FIG. 4. Referring to FIG. 5, a top plan view, looking approximately in the direction of arrow 5 shown in FIG. 4, of the damaged core cell wall 38 of FIG. 4 is shown. As best shown in FIG. 4, the example damaged core cell wall 38 of the core cell 34 is in the form of a crack. This crack has the negative effect of reducing the effectiveness of the cavity 30 of the core cell 34 to function as a Helmholtz resonator and thereby reducing the sound attenuation capacity of the core cell 34. Accordingly, it would be desirable to repair the damaged core cell wall 38 to restore the sound attenuation capacity of the core cell 34 and thereby restore the sound attenuation capacity of the acoustic sandwich panel 10 (FIG. 1).

Figure 6:
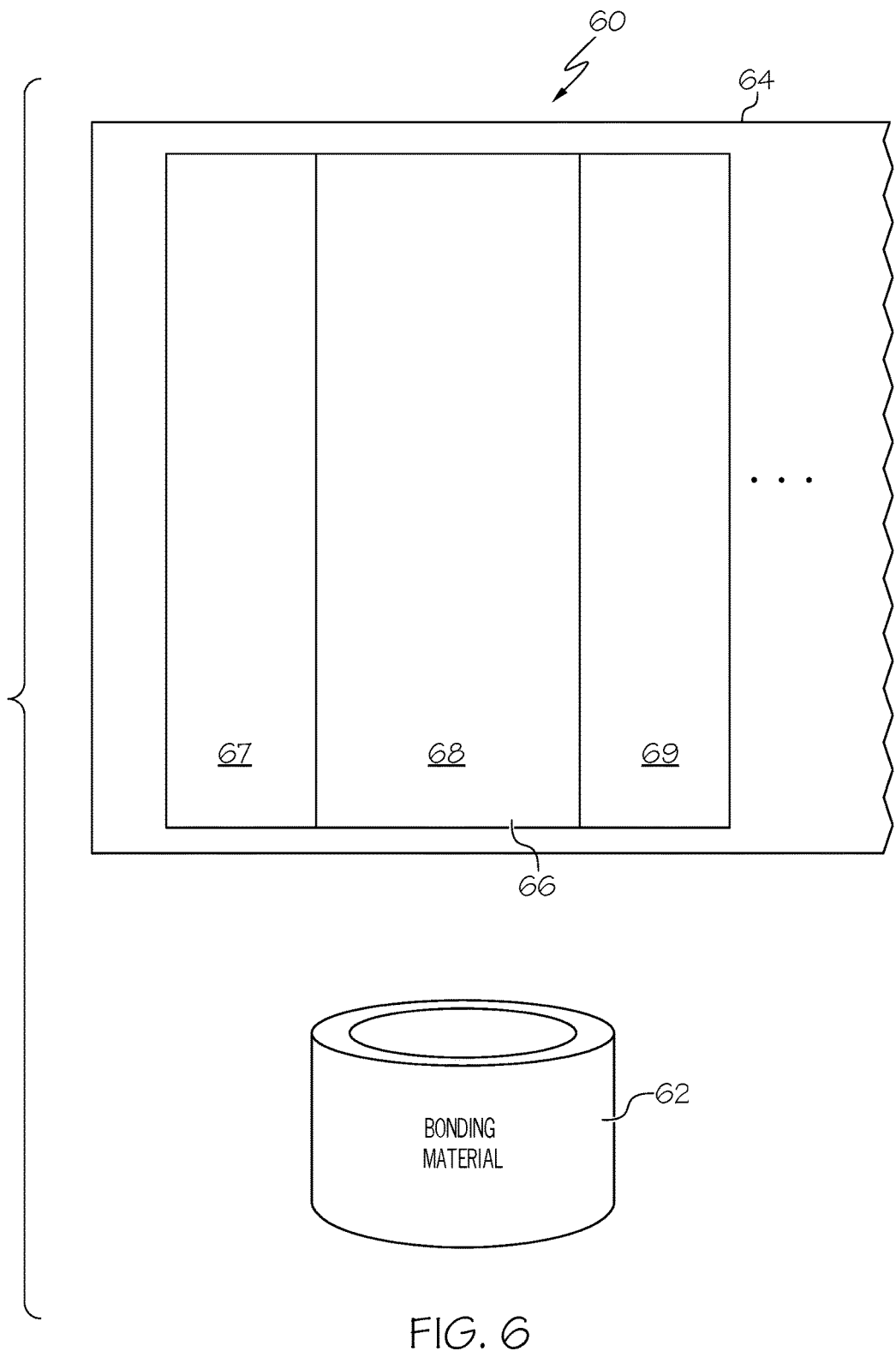
FIG. 6 is a perspective view of an acoustic sandwich panel repair kit constructed in accordance with an embodiment, which contains a bonding material and a ribbon of core repair splices for repairing the damaged core cell wall of FIGS. 3-5.

Referring to FIG. 6, a perspective view of an acoustic sandwich panel repair kit 60 constructed in accordance with an embodiment is shown. The acoustic sandwich panel repair kit 60 includes a container of bonding material 62 and a ribbon 64 of core repair splices 66 for repairing damaged walls, such as the damaged core cell wall 38 shown in FIGS. 3-5. The bonding material 62 may comprise an adhesive. In one implementation, an epoxy paste adhesive is used. An example epoxy past adhesive is LOCTITE® EA 9394 AERO™ available from Henkel Corporation Aerospace located in Bay Point, Calif., U.S.A. In another implementation, a high viscosity adhesive is used. Other implementations of bonding material 62 are possible.

The ribbon 64 includes a plurality of core repair splices 66, only one of which is shown in FIG. 6. The ellipsis shown in FIG. 6 designates other one or more of core repair splices on the ribbon 64. For simplicity and clarity of discussion, only the core repair splice 66 shown in FIG. 6 is described herein. The core repair splice 66 includes a plurality of surfaces shaped to conform to a number of damaged walls. More specifically, the plurality of surfaces includes a first flat surface 68, a second flat surface 67 that is oblique to the first flat surface 68 at one edge of the first flat surface 68, and a third flat surface 69 that is oblique to the first flat surface 68 at an opposite end edge of the first flat surface 68.

Each of the panels 67, 68, 69 has a length or height (as viewed looking at FIG. 6) that is greater than the distance between the first liner sheet 14 and the second liner 16 (FIG. 1), for example. Each of the panels 67, 68, 69 has a width that is about the width of a core cell wall of a core cell, such as the width of the damaged core cell wall 38 of the core cell 34 shown in FIGS. 3-5. The core repair splice 66 comprises material that is substantially the same or similar to the material of the damaged core cell wall 38.

Figure 7:
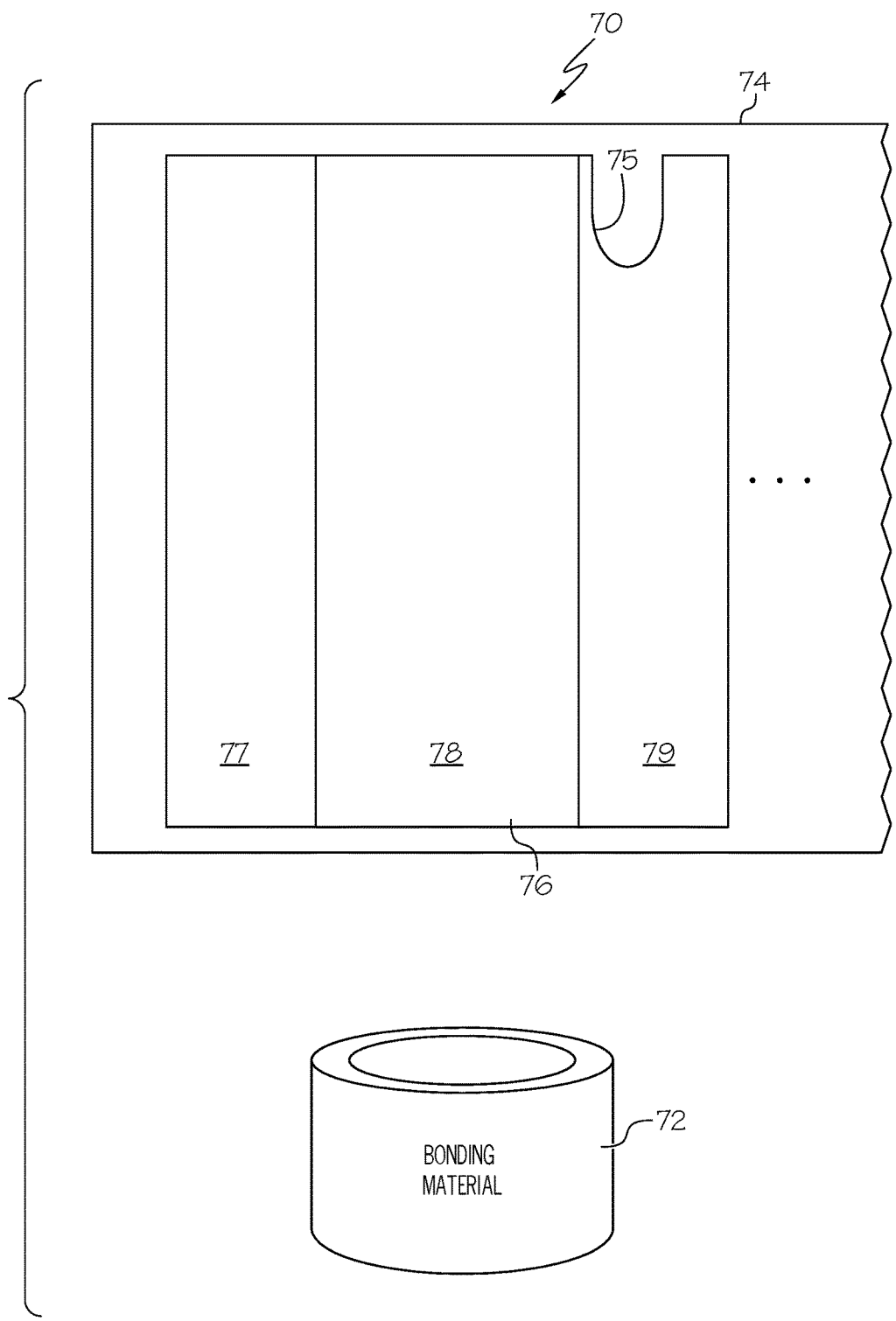
FIG. 7 is a perspective view similar to the perspective view of FIG. 6, and showing an acoustic sandwich panel repair kit constructed in accordance with another embodiment.

Referring to FIG. 7, a perspective view similar to the perspective view of FIG. 6 is shown. FIG. 7 shows an acoustic sandwich panel repair kit 70 constructed in accordance with another embodiment. The acoustic sandwich panel repair kit 70 includes a container of bonding material 72 and a ribbon 74 of core repair splices 76 for repairing damaged walls. The bonding material 72 may comprise an adhesive. In one implementation, an epoxy paste adhesive is used. An example epoxy past adhesive is LOCTITE® EA 9394 AERO™ available from Henkel Corporation Aerospace located in Bay Point, Calif., U.S.A. In another implementation, a high viscosity adhesive is used. Other implementations of bonding material 72 are possible.

The ribbon 74 includes a plurality of core repair splices 76, only one of which is shown in FIG. 7. The ellipsis shown in FIG. 7 designates other one or more of core repair splices on the ribbon 74. For simplicity and clarity of discussion, only the core repair splice 76 shown in FIG. 7 is described herein. The core repair splice 76 includes a plurality of surfaces shaped to conform to a number of damaged walls. More specifically, the plurality of surfaces includes a first flat surface 78, a second flat surface 77 that is oblique to the first flat surface 78 at one edge of the first flat surface 78, and a third flat surface 79 that is oblique to the first flat surface 78 at an opposite end edge of the first flat surface 78. Further, one or more of the three panels 77, 78, 79 may have one or more slots formed therein depending upon the need of the particular repair application. As shown in the example implementation of FIG. 7, the panel 79 has one slot 75 formed at one end of the panel 79. The slot 75 is provided for the purpose of water drainage.

Each of the panels 77, 78, 79 also has a length or height (as viewed looking at FIG. 7) that is greater than the distance between liner sheets of the particular acoustic sandwich panel that is being repaired. Also, each of the panels 77, 78, 79 has a width that is about the width of a damaged core cell wall of an acoustic core cell of the acoustic sandwich panel that is being repaired. The core repair splice 76 comprises material that is substantially the same or similar to the material of a damaged core cell wall of an acoustic core cell of the acoustic sandwich panel that is being repaired.

Figure 8:
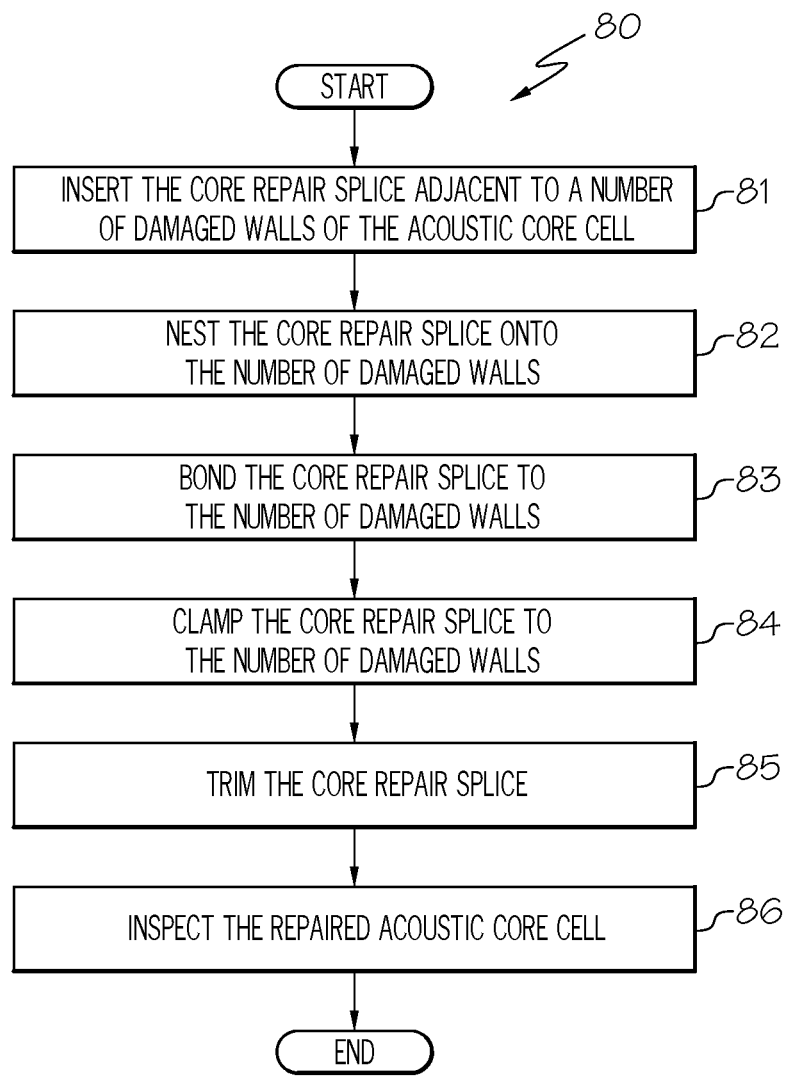
FIG. 8 is a flow diagram illustrating a method of repairing the damaged core cell wall of FIGS. 3-5 in accordance with an embodiment.
Figure 9:
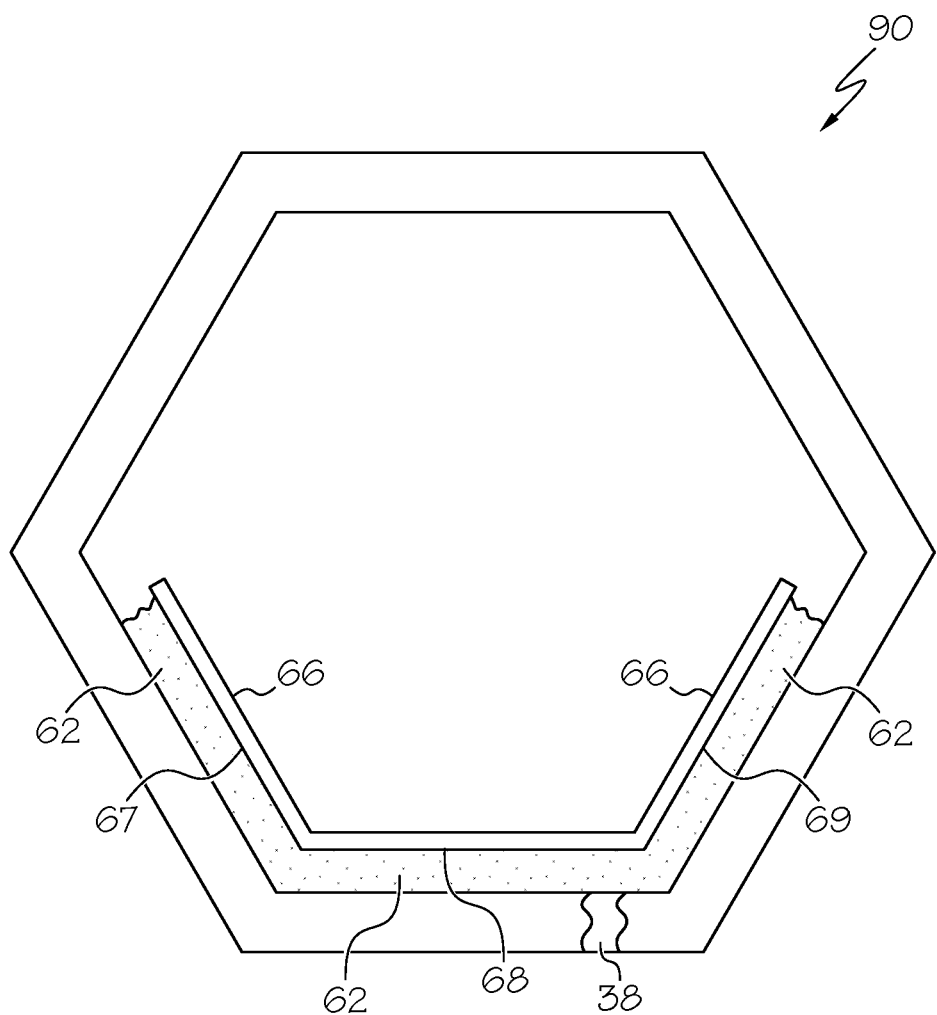
FIG. 9 is a top plan view similar to the top view of FIG. 5, and showing the damaged core cell wall of the acoustic core cell of FIGS. 3-5 repaired with the bonding material and a core repair splice of the repair kit of FIG. 6.

Referring to FIG. 8, a flow diagram 80 is shown illustrating a method of repairing the damaged core cell wall 38 of FIGS. 3-5 using a core repair splice 66 of FIG. 6 in accordance with an embodiment. Referring to FIG. 9, a top plan view similar to the top plan view of FIG. 5 is shown. More specifically, FIG. 9 shows the damaged core cell wall 38 of FIGS. 3-5 repaired with the bonding material 62 and a core repair splice 66 of the repair kit 60 of FIG. 6. The repaired acoustic core cell is designated with reference numeral "90" in FIG. 9. The acoustic sandwich panel repair method 80 and acoustic sandwich panel repair kits 60, 70 disclosed herein may be employed according to FAA regulations. Specifications of FAA regulations for repairing acoustic sandwich panels are known and, therefore, will not be described.

In the flow diagram 80 of FIG. 8, the core repair splice 66 is inserted adjacent to a number of damaged walls of the acoustic core cell 34 (block 81). The core repair splice 66 is nested onto the number of damaged walls (block 82). In the example implementation shown in FIG. 9, the panel 68 of the core repair splice 66 is nested onto the damaged core cell wall 38, and the other two panels 67, 69 are nested onto walls adjacent to the damaged core cell wall 38.

The core repair splice 66 is then bonded to the number of damaged walls to repair the acoustic core cell 34 to provide the repaired acoustic core cell 90 (block 83). As shown in FIG. 9, the panels 67, 68, 69 are bonded with bonding material 62 to core cell walls including the damaged core cell wall 38. It should be noted that the thickness of the bonding material 62 between the core repair splice 66 and the core cell walls including the damaged core cell wall 38 is shown exaggerated for purposes of illustration.

In one example implementation, adhesive is applied to the core repair splice 66 and nested regions of the number of damaged walls. In another example implementation, the core repair splice 66 is buttered with a thin layer of high viscosity adhesive. In still another example implementation, the core repair splice 66 is buttered with an epoxy paste adhesive.

After the core repair splice 66 is bonded to the number of damaged walls, the core repair splice 66 is clamped to the number of damaged walls (block 84). In one example implementation, one or more hair clips can be inserted into the cavity 30 to clamp the core repair splice 66 to the damaged core cell wall 38 when the bonding material 62 cures. In another implementation, one or more foam ear plugs can be inserted into the cavity 30 to clamp the core repair splice 66 to the damaged core cell wall 38 when the bonding material 62 cures. After the bonding material 62 cures and the one or more foam ear plugs or hair clips are removed.

After block 84, the core repair splice 66 is trimmed (block 85). In one implementation, the core repair splice 66 is trimmed such that the core repair splice 66 extends flush with a core surface of the acoustic core cell 34 when the trimmed core repair splice is bonded to the number of damaged walls. In another implementation, the core repair splice 66 is trimmed such that the core repair splice 66 extends beyond a core surface of the acoustic core cell when the trimmed core repair splice is bonded to the number of damaged walls. While the above description described the core repair splice 66 being trimmed after the core repair splice 66 is bonded to the number of damaged walls, it is conceivable that the core repair splice 66 be trimmed before the core repair splice 66 is inserted adjacent to the number of damaged walls. As a result, the repaired acoustic core cell 90 shown in FIG. 9 is provided and subsequently inspected to ensure quality of the repair (block 86).

Figure 10:
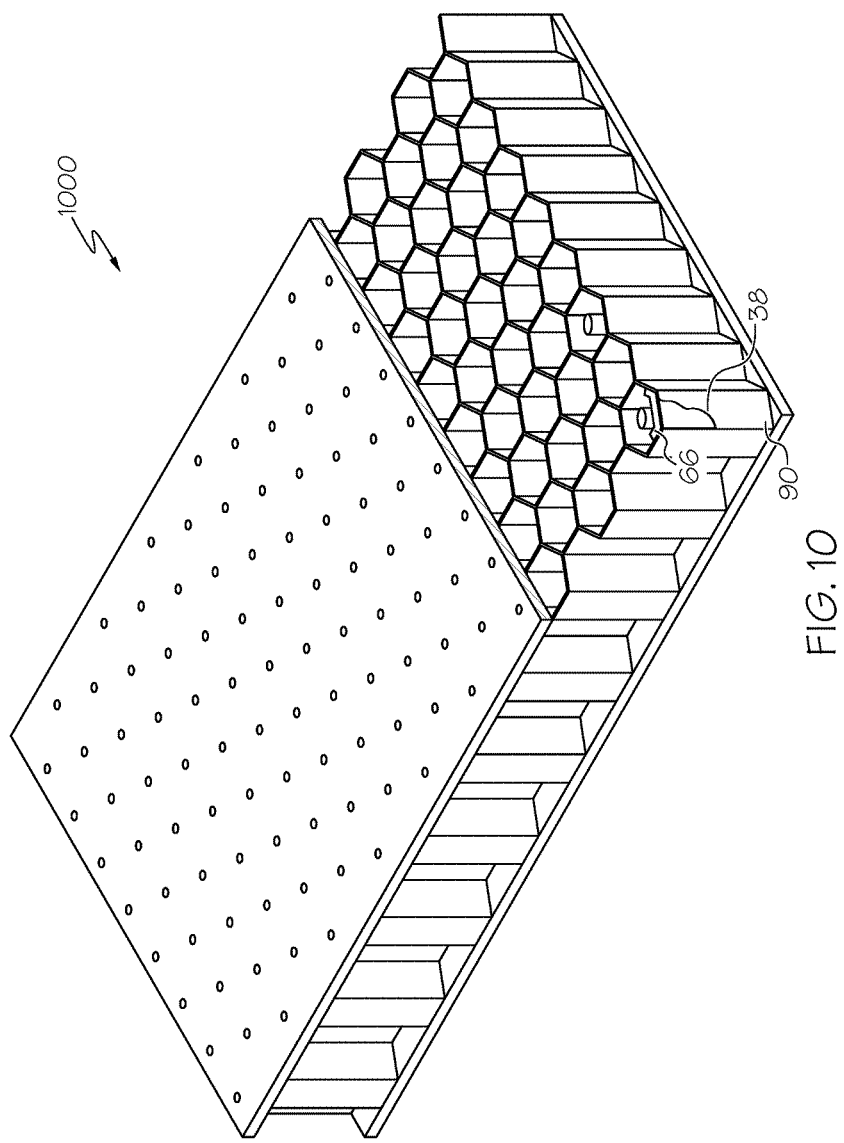
FIG. 10 is a perspective view similar to the perspective view of FIG. 3, and showing the repaired core cell wall of the acoustic core cell of FIG. 9 as part of repaired acoustic sandwich panel.

The core repair splice 66 and the bonding adhesive 62 disposed on the panels 67, 68, 69 of the core repair splice 66 provide structural support and reinforcement for the damaged core cell wall 38 to thereby provide repaired acoustic core cell 90 (FIG. 9) that is part of repaired acoustic sandwich panel 1000 shown in FIG. 10.

It should be apparent that the above-disclosed acoustic sandwich panel repair method 80 (FIG. 8) and acoustic sandwich panel repair kits 60, 70 (FIG. 6 and FIG. 7) allows a damaged acoustic core cell of an acoustic sandwich panel to be repaired without fouling acoustic septa in a cavity of the acoustic core cell. In one disclosed implementation described hereinabove, attenuation capacity of at least one septum that is disposed in a cavity of an acoustic core cell is substantially unaffected by epoxy paste adhesive. The disclosed acoustic sandwich panel repair method 80 and acoustic sandwich panel repair kits 60, 70 for repairing an acoustic sandwich panel of an aircraft are in accordance with applicable industry regulations, such as FAA regulations for example.

Although the above-description describes acoustic sandwich panel repair method 80 and acoustic sandwich panel repair kits 60, 70 for airplanes in the aviation industry in accordance with FAA regulations, it is contemplated that the acoustic sandwich panel repair method 80 and the acoustic sandwich panel repair kits 60, 70 may be implemented for any industry in accordance with the applicable industry standards.

It should also be apparent that the disclosed acoustic sandwich panel repair method 80 and acoustic sandwich panel repair kits 60, 70 provide the capability to easily repair damaged acoustic core cells of acoustic sandwich panels with repair splices made from existing core material and readily bonded with available adhesive. This allows aircraft maintenance and service to quickly make a repair, resulting in lower maintenance and service costs.

Although various embodiments of the disclosed acoustic sandwich panel repair methods and acoustic sandwich panel repair kits have been shown and described, modifications may occur to those skilled in the art upon reading the specification. The present application includes such modifications and is limited only by the scope of the claims.

What is claimed is:

1. A method of repairing an acoustic core cell of an acoustic sandwich panel, the method comprising:
   inserting a core repair splice adjacent to a number of damaged walls of the acoustic core cell of the acoustic sandwich panel;
   nesting the core repair splice onto the number of damaged walls; and
   bonding the core repair splice to the number of damaged walls and thereby to repair the acoustic core cell of the acoustic sandwich panel.

2. The method of claim 1 further comprising:
   trimming the core repair splice before the core repair splice is inserted adjacent to the number of damaged walls.

3. The method of claim 2 wherein trimming the core repair splice includes trimming the core repair splice such that the core repair splice extends flush with a core surface of the acoustic core cell when the trimmed core repair splice is bonded to the number of damaged walls.

4. The method of claim 2 wherein trimming the core repair splice includes trimming the core repair splice such that the core repair splice extends beyond a core surface of the acoustic core cell when the trimmed core repair splice is bonded to the number of damaged walls.

5. The method of claim 1 wherein bonding the core repair splice includes applying adhesive to the core repair splice and nested regions of the number of damaged walls.

6. The method of claim 5 wherein applying adhesive to the core repair splice includes buttering the core repair splice with a thin layer of high viscosity adhesive.

7. The method of claim 5 wherein applying adhesive to the core repair splice includes buttering the core repair splice with an epoxy paste adhesive.

8. The method of claim 5 further comprising:
   clamping the core repair splice to the number of damaged walls during adhesive cure.

9. The method of claim 1 further comprising:
   inspecting the repaired acoustic core cell of the acoustic sandwich panel after the core repair splice has bonded to the number of damaged walls.

* * * * *